UNITED STATES PATENT OFFICE.

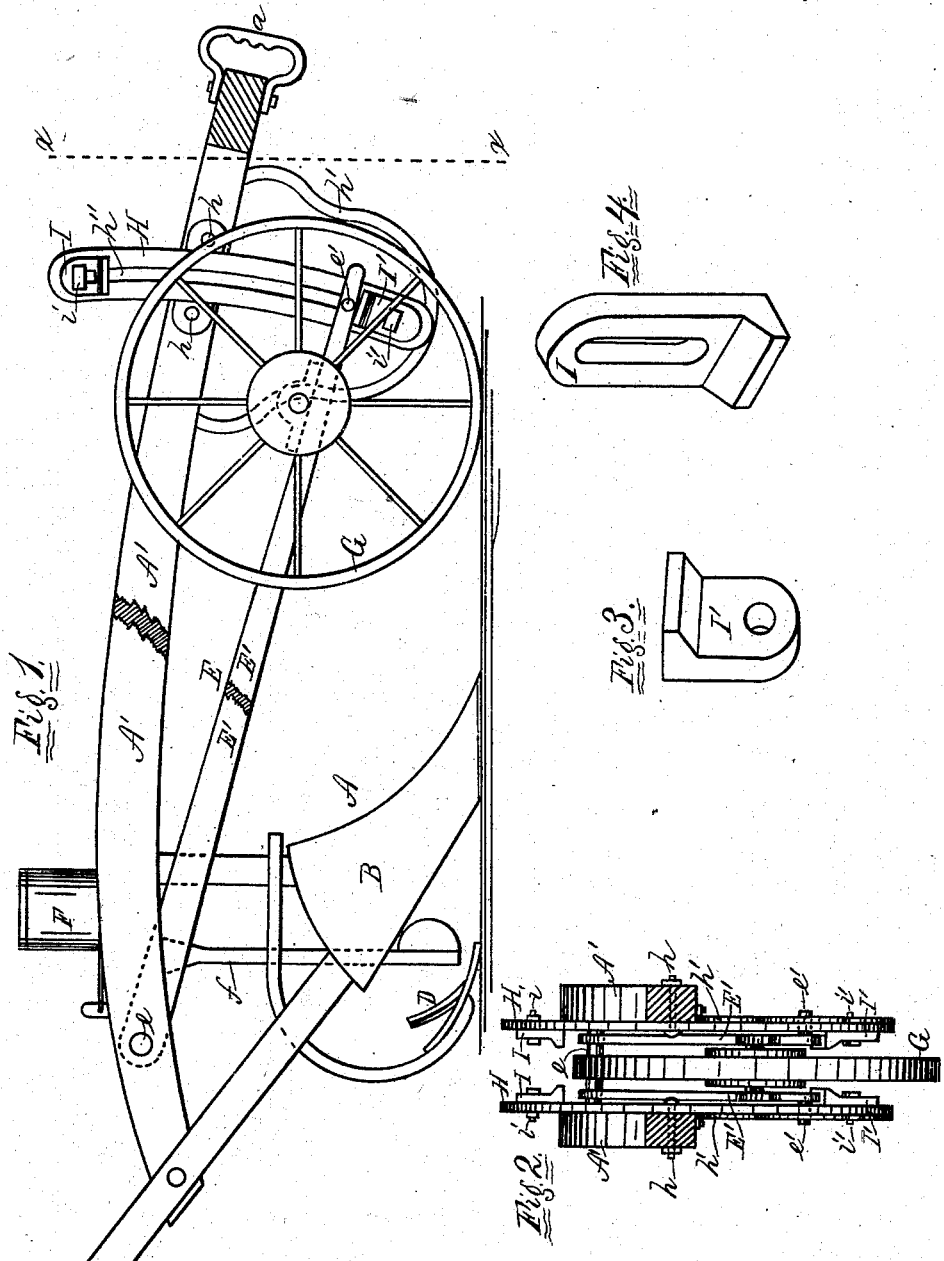

LINDEN KIRLIN, OF WHITE CLOUD, KANSAS.

COMBINED LISTER AND DRILL.

SPECIFICATION forming part of Letters Patent No. 274,004, dated March 13, 1883.

Application filed April 30, 1881. (No model.)

*To all whom it may concern:*

Be it known that I, LINDEN KIRLIN, a citizen of the United States, residing at White Cloud, in the county of Doniphan and State of Kansas, have invented certain new and useful Improvements in Lister Seed-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to lister seed-planters of that class in which the drive-wheel is carried in front of the plow; and the principal object of the invention is to render this class of planters operative in rough ground by preventing the drive-wheel from affecting the uniform depth of operation of the plow; and to this end mainly, and to others secondarily, the invention consists in constructions and combinations hereinafter described.

Figure 1 is a side elevation of parts seen with a portion of the nearest beam and its hanger and part of one bar E' removed. Fig. 2 is a sectional elevation in the line x x in Fig. 1. Figs. 3 and 4 are details.

Referring to the drawings by letters, the same letter indicating the same part in the different figures, A represents an ordinary lister-plow, or plow with a double mold-board, B, handles C, coverer D, double beams A' A', and draft-clevis a.

E is a swinging frame, formed of parallel bars E', hinged at their rear ends to the beams A' by a bolt, e, or any suitable hinge device, at a point near the seed-box F, which box F is shown fixed upon the beams A', but may, if preferred, be fixed upon the swinging frame E. A seed-tube, f, leads in the ordinary manner from the seed-box to the ground in front of the covering-shares D.

G is the drive-wheel, journaled near the front end of the frame E, between the bars E'. The gear mechanism between the wheel G and seed-dropping devices in the seed-box is not shown in the drawings, and such gear may be by belt, by chain-wheels, or pinions and shafts in any ordinary or desired manner.

To each beam A' a hanger, H, is secured by bolts h and brace h'. Each hanger H has a longitudinal slot, h''.

I I' are shouldered stops, which may be adjusted higher and lower on the hangers H, and held after adjustment respectively by bolts i i', which pass through holes in the stops I I' and through the slots h''. A short stud, e', projects from each bar E' into the slot h'' in the adjacent hanger H.

In operation the forward end of the frame E is held in place laterally by the hangers H, while it swings freely in a vertical plane, and thereby permits the wheel G to rise and fall over uneven ground, roots, stalks, and other things, without affecting or disturbing the plow, by raising the forward end of the plow-beams. The extent to which the wheel G may rise and fall relatively to the plow-beams is adjusted by adjusting the stops I I'. The upper stops, I, may be adjusted to regulate the extent to which the front ends of the plow-beams may descend, and thereby, to a certain extent, regulate the depth to which the plows may operate, and to increase the capacity of the stop I in this respect it is slotted, as shown at Fig. 4.

By adjusting the stops I I' the frame E may be made rigid when desired.

Having thus described my invention, what I claim as new, and desire to secure by Letters Patent, is—

1. In a lister and planter, in combination with a lister-plow having double beams A' A', a frame, E, hinged at its rear end between said plow-beams, in front of the plow, and provided at its forward end with a drive-wheel adapted to rise and fall over uneven ground, the slotted brackets H, adapted to sustain frame E laterally, and to permit it and wheel G to rise and fall in operation in planting, substantially as and for the purpose specified.

2. In combination, substantially as described, with the lister-plow and seeding devices, swinging frame E, wheel G, and slotted brackets H, the stops I I', adjustably secured to said brackets, for the purpose specified.

3. In combination, substantially as described, with the lister-plow and seeding devices, swinging frame E, wheel G, and slotted brackets H, the stop I, adjustably secured to said brackets, for the purpose specified.

In testimony whereof I affix my signature in presence of two witnesses.

LINDEN KIRLIN.

Witnesses:
JOHN S. CAIN,
W. H. FARROW.